(12) United States Patent
Chen et al.

(10) Patent No.: US 9,408,076 B2
(45) Date of Patent: Aug. 2, 2016

(54) SENSOR-ASSISTED BIOMETRIC AUTHENTICATION FOR SMARTPHONES

(71) Applicant: The Regents of the University of California, Oakland, CA (US)

(72) Inventors: Shaxun Chen, Menlo Park, CA (US); Amit Pande, Davis, CA (US); Prasant Mohapatra, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/711,631

(22) Filed: May 13, 2015

(65) Prior Publication Data

US 2015/0334567 A1    Nov. 19, 2015

Related U.S. Application Data

(60) Provisional application No. 61/993,017, filed on May 14, 2014.

(51) Int. Cl.
| | | |
|---|---|---|
| *H04M 1/66* | (2006.01) | |
| *H04W 12/06* | (2009.01) | |
| *G06K 9/00* | (2006.01) | |

(52) U.S. Cl.
CPC ........... *H04W 12/06* (2013.01); *G06K 9/00248* (2013.01); *G06K 9/00288* (2013.01); *G06K 9/00302* (2013.01)

(58) Field of Classification Search
CPC .............. H04W 12/06; G06K 9/00302; G06K 9/00248; G06K 9/00288
USPC ........................ 455/411, 418, 419, 420, 550.1
See application file for complete search history.

(56) References Cited

U.S. PATENT DOCUMENTS

| | | | | |
|---|---|---|---|---|
| 8,542,879 B1* | 9/2013 | Nechyba | ............ | G06K 9/00228 382/103 |
| 8,805,110 B2* | 8/2014 | Rhoads | ......................... | 382/255 |
| 8,913,004 B1* | 12/2014 | Bozarth | ............. | G06K 9/00604 345/156 |
| 2008/0118152 A1* | 5/2008 | Thorn | ................... | G06F 1/3218 382/190 |
| 2014/0025973 A1* | 1/2014 | Schillings | ................ | H04Q 9/00 713/323 |
| 2015/0019440 A1* | 1/2015 | Yang | ...................... | G06Q 20/36 705/65 |
| 2015/0055821 A1* | 2/2015 | Fotland | ................ | G06K 9/3241 382/103 |

* cited by examiner

*Primary Examiner* — Khai M Nguyen
(74) *Attorney, Agent, or Firm* — Park, Vaughan, Fleming & Dowler LLP; Laxman Sahasrabuddhe

(57) ABSTRACT

During a technique for authenticating a user using a portable electronic device (such as a smartphone) while preventing successful 2D media attacks and virtual-camera attacks, the portable electronic device provides an instruction to a user to move the portable electronic device relative to the user's face. Then, using an imaging sensor in the portable electronic device, the portable electronic device acquires, a series of images while the portable electronic device is at different positions or orientations relative to the user's face, where the series of images include at least two images relative to a symmetry axis of the user's face (such as the midline). Moreover, the portable electronic device determines a change in a sign of a nose angle in at least the two images. Next, the portable electronic device authenticates the user based on at least one of the series of images using a facial-recognition technique.

20 Claims, 6 Drawing Sheets

SENSOR-ASSISTED BIOMETRIC AUTHENTICATION FOR SMARTPHONES

CROSS-REFERENCE TO RELATED APPLICATION

This application claims priority under 35 U.S.C. §119(e) to U.S. Provisional Application Ser. No. 61/993,017, entitled "Sensor-Assisted Facial Recognition: An Enhanced Biometric Authentication System for Smartphones," by Shaxun Chen, Amit Pande and Prasant Mohapatra, filed on May 14, 2014, the contents of which are herein incorporated by reference.

BACKGROUND

1. Field

The described embodiments relate to techniques for authenticating an individual. In particular, the described embodiments relate to techniques for authenticating an individual using facial images and/or sensor data from sensors in an electronic device to prevent spoofing attempts.

2. Related Art

Portable electronic devices, such as smartphones and tablets, are increasingly popular computing platforms. Moreover, the ubiquity and enhanced functionality of portable electronic devices has resulted is an ever-increasing suite of applications for use with portable electronic devices, including mobile-payment applications. Consequently, securing valuable information on portable electronic devices is increasingly important.

A variety of security techniques are used on portable electronic devices, including authentication. During an authentication process, whether an individual is who they say they are is confirmed. For example, a user can be authenticated using a credential, such as a username/password or a passcode.

In principle, biometric authentication offers advantages over credential-based authentication. In particular, biometric authentication is considered to be more secure, because it is based on 'who the user is' and biometric information is typically difficult to forge or spoof. In contrast, credential-based authentication relies on 'what the user knows,' which can be lost or stolen and is more likely to result in identity theft. In addition, biometric authentication is usually much easier to use. For example, users do not need to remember a list of passwords for various websites and applications. While a portable electronic device or a browser can remember the username and password for users, this often introduces additional security threats, such as allowing other to access user accounts if a user leaves their portable electronic device unattended. Because of these advantages, biometric authentication (e.g., via fingerprint sensors) are widely used on portable electronic devices.

While the availability of high-resolution front-facing cameras in many portable electronic devices can allow facial recognition based on high quality images of a user's face to be used for biometric authentication in portable electronic devices, in practice this has not happened yet. This is because there is often a tradeoff between security and ease of use. In particular, simple 2-dimensional (2D) facial recognition can be easily fooled by a photograph of a user (which is sometimes referred to as a 'photo attack' or a 'print attack'), which is not difficult to obtain in social networks.

A more sophisticated facial-recognition technique requires the user to blink their eyes during the authentication, but can still be circumvented by photo editing or by playing a clip of video, which is sometimes referred to as a 'video attack.' (Note that photo attacks and video attacks are together referred to as '2D media attacks.') In another more sophisticated facial-recognition technique, a 3D facial recognition technique requires users to turn their heads towards four directions according to a sequence of arrows shown on a screen. In this way, an authentication program is able to differentiate a real 3D face from a flat photo. However, the entire authentication process takes approximately 30 seconds, which is too long and compromises ease of use (which is one of the important advantages of biometric authentication).

Furthermore, the availability of virtual cameras has also limited the use of facial recognition. A virtual camera is a type of software that adds a layer between a real physical camera and an operating system. This type of software adds dynamic effects to the images from the physical camera, making the video look more beautiful and live chat more interesting. However, virtual cameras have now become sufficiently powerful that they can not only modify the face, hair and backgrounds, but also stream a pre-recorded video, making the operating system believe it is captured by the physical camera in real time. Consequently, in spite of their original purpose, virtual camera software can seriously threaten the security of facial recognition-based authentication.

SUMMARY

The described embodiments relate to a portable electronic device. This portable electronic device includes: an imaging sensor (such as a front-facing camera) that acquires one or more images; a processor; and memory that stores a program module that is executed by the processor. During execution of the program module, the portable electronic device provides an instruction to a user to move the portable electronic device relative to a face of the user. Then, the portable electronic device acquires, using the imaging sensor, a series of images while the portable electronic device is at different positions relative to the face of the user, where the series of images include at least two images relative to a symmetry axis of the face of the user. Moreover, the portable electronic device determines a change in a sign of a nose angle in at least the two images. Next, the portable electronic device authenticates the user based on at least one of the series of images using a facial-recognition technique.

Furthermore, the portable electronic device may include a motion sensor (such as an accelerometer, a gyroscope, an inertial motion sensor, a compass and/or a magnetometer) that measures motion information. Prior to the authenticating, the portable electronic device may associate the motion information with a change in a position of an object in the series of images. For example, the change in the position may be based on differences in pixels in the series of images. Note that the motion information may include vibrations and rotations of the portable electronic device. In some embodiments, the associating involves correlating the motion information and the change in the position of the object.

Note that the series of images may include a video with multiple images.

Moreover, the portable electronic device may authenticate the user while preventing successful 2D media attacks and virtual-camera attacks.

Furthermore, the symmetry axis may include a midline of the face of the user. Consequently, the instruction to move the portable electronic device may specify at least a horizontal component of the movement.

In some embodiments, the portable electronic device includes a display and an ambient light sensor. When ambient light intensity in an environment of the portable electronic device is below a threshold value, the portable electronic device may increase a brightness of the display.

Additionally, the determining the change in the sign of the nose angle may involve: identifying regions that include a nose in the face of the user in at least the two images; determining edges of the nose in the regions using an edge-detection technique; and calculating the nose angle based on the determined edges.

Another embodiment provides a computer-program product for use with the portable electronic device. This computer-program product includes instructions for at least some of the operations performed by the portable electronic device.

Another embodiment provides a method for authenticating the user, which may be performed by the portable electronic device. During operation, the portable electronic device provides the instruction to the user to move the portable electronic device relative to the face of the user. Then, using the imaging sensor in the portable electronic device, the portable electronic device acquires the series of images while the portable electronic device is at the different positions relative to the face of the user, where the series of images include at least the two images relative to the symmetry axis of the face of the user. Moreover, the portable electronic device determines the change in the sign of the nose angle in at least the two images. Next, the portable electronic device authenticates the user based on at least one of the series of images using the facial-recognition technique.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
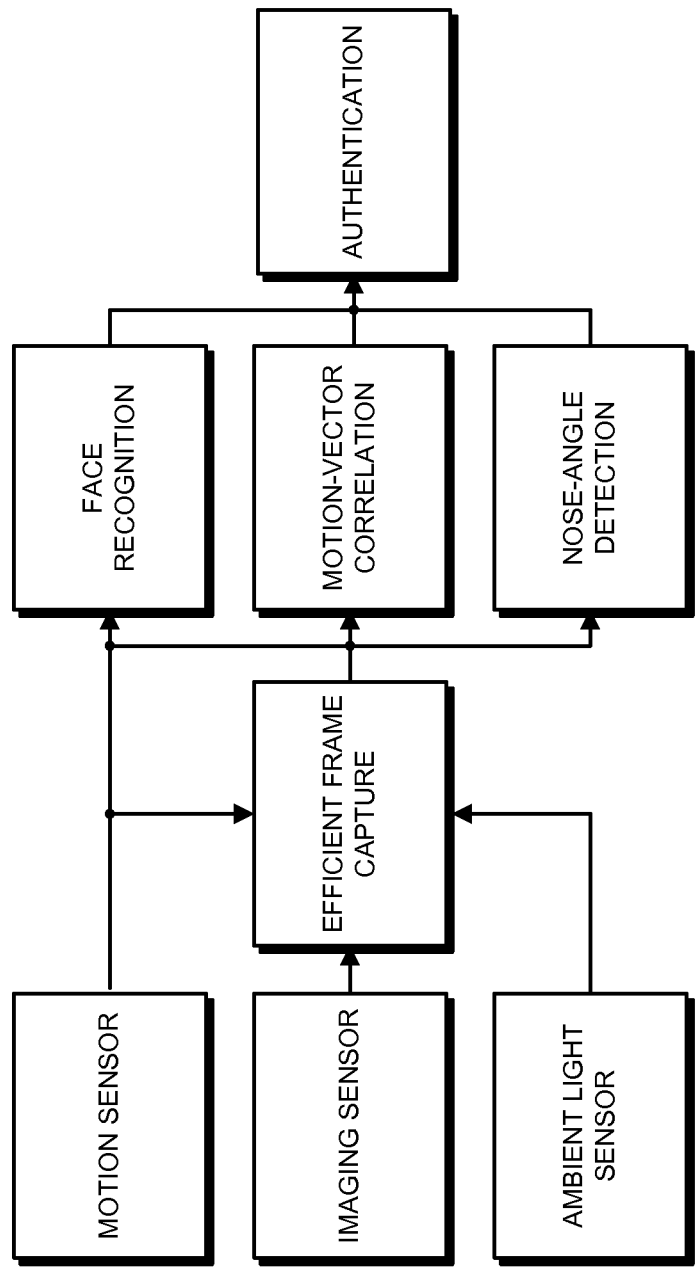
FIG. 1 is a block diagram illustrating an authentication technique for authenticating a user in accordance with an embodiment of the present disclosure.

During a technique for authenticating a user using a portable electronic device (such as a smartphone) while preventing successful 2D media attacks and virtual-camera attacks, the portable electronic device provides an instruction to a user to move the portable electronic device relative to the user's face. Then, using an imaging sensor in the portable electronic device, the portable electronic device acquires a series of images while the portable electronic device is at different positions or orientations relative to the user's face, where the series of images include at least two images relative to a symmetry axis of the user's face (such as the midline). Moreover, the portable electronic device determines a change in a sign of a nose angle in at least the two images. Next, the portable electronic device authenticates the user based on at least one of the series of images using a facial-recognition technique.

By preventing successful 2D media attacks and virtual-camera attacks, the authentication technique increases the security of facial recognition-based authentication (such as smartphone unlock and/or application login) while maintaining ease of use (because the authentication technique is simple and intuitive). In particular, the authentication speed may be the same as or faster than credential-based authentication. For example, using the authentication technique, a user may be authenticated in less than a few seconds (such as in 2 s). Consequently, the authentication technique may make facial recognition more practical and useful with portable electronic devices, and may improve the user experience when using facial recognition on portable electronic devices.

In the discussion that follows, a smartphone is used as an illustration of a portable electronic device. However, the authentication technique may be used with a wide variety of electronic devices, includes those that are not portable (e.g., by acquiring at least the two images using different imaging sensors instead of having the user move the portable electronic device).

We now describe the authentication technique. Smartphones are typically equipped with multiple sensors, including: one or more motion sensors (such as an accelerometer, a gyroscope, an inertial motion sensor, a compass and/or a magnetometer), an imaging sensor (such as a camera) a proximity sensor, an ambient light sensor, a sound sensor (such as a microphone) and/or a 'positioning sensor' (via the Global Positioning System). Existing facial-authentication techniques use a camera to capture an image or a video of the user's face, and then compare it with one or more pre-defined templates.

In the discussion that follows, sensor-assisted facial authentication is described. In this authentication technique, sensors in a smartphone (such as a camera or an imaging sensor, one or more motion sensors and/or an ambient light sensor) are used to enhance the security and/or improve the performance of the authentication process. This authentication technique may defend against 2D media attacks and virtual-camera attacks. For example, the one or more motion sensors may be used to intelligently choose the necessary images or frames in a video for further processing, while the ambient light sensor may trigger screen or display brightness adjustment to improve the authentication accuracy. In particular, the one or more motion sensors and an object-recognition technique can be used to infer the relative position between the imaging sensor and the user's face, so that synchronization can be performed automatically and quickly.

FIG. 1 presents a block diagram illustrating an authentication technique for authenticating a user using sensors in a portable electronic device (such as a smartphone). In the authentication technique, the one or more motion sensors may be used to infer the position and orientation of the imaging sensor (such as a front-facing camera). In particular, small movement of the smartphone can be detected, which may ensure a real 3D face, and which may result in much easier operation and faster authentication. For example, in order to defend against virtual-camera attacks without imposing an extra operation on the user, shaking (i.e., vibration, rotation and, more generally, motion information) of the video and the smartphone may be extracted separately and then compared to each other (such as by correlating motion information with changes in the position of an object in the images).

Figure 4:
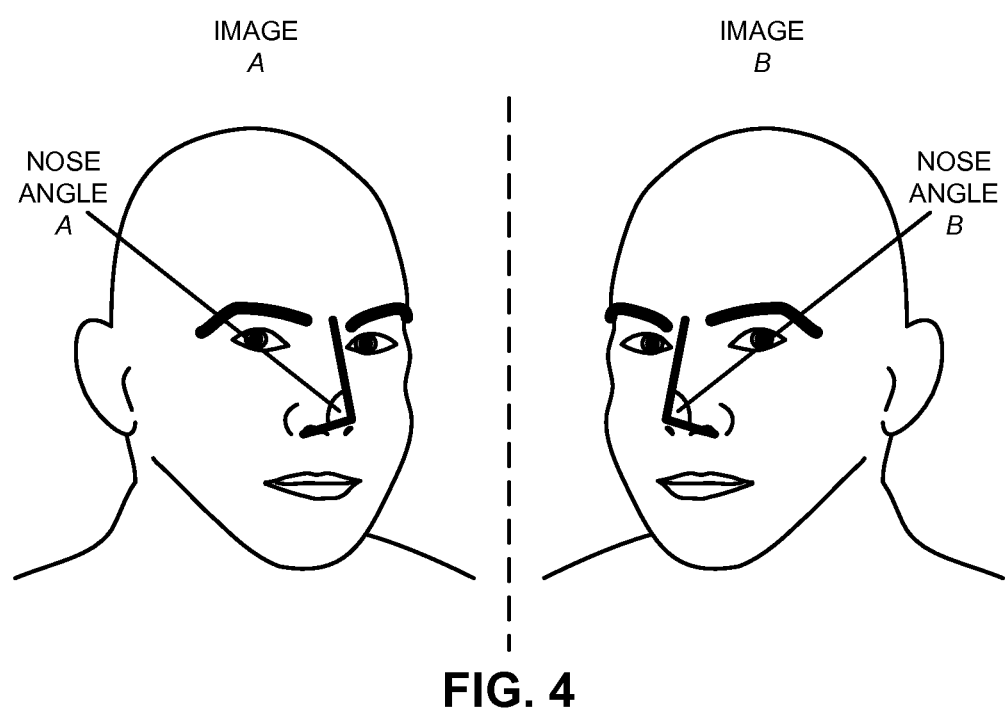
FIG. 4 is a drawing illustrating a change in nose angle in two images in accordance with an embodiment of the present disclosure.

Moreover, as described further below with reference to FIG. 4, by comparing a detected nose angle in images acquired on either side of the user's facial midline, 2D media attacks may be countered. Furthermore, as noted previously, when the ambient light intensity is below a threshold value, the brightness of a display or a screen in the smartphone may be increased to illuminate the user's face.

The authentication technique may provide a very high detection rate for 2D media attacks and virtual-camera attacks (such as better than 80% detection, e.g., a 95% detection rate and 2% false-alarm rate for virtual-camera attacks). In addition, the average authentication time of the authentication technique may be approximately 2 seconds, which is about ten times faster than the existing 3D facial authentication techniques.

Figure 2:
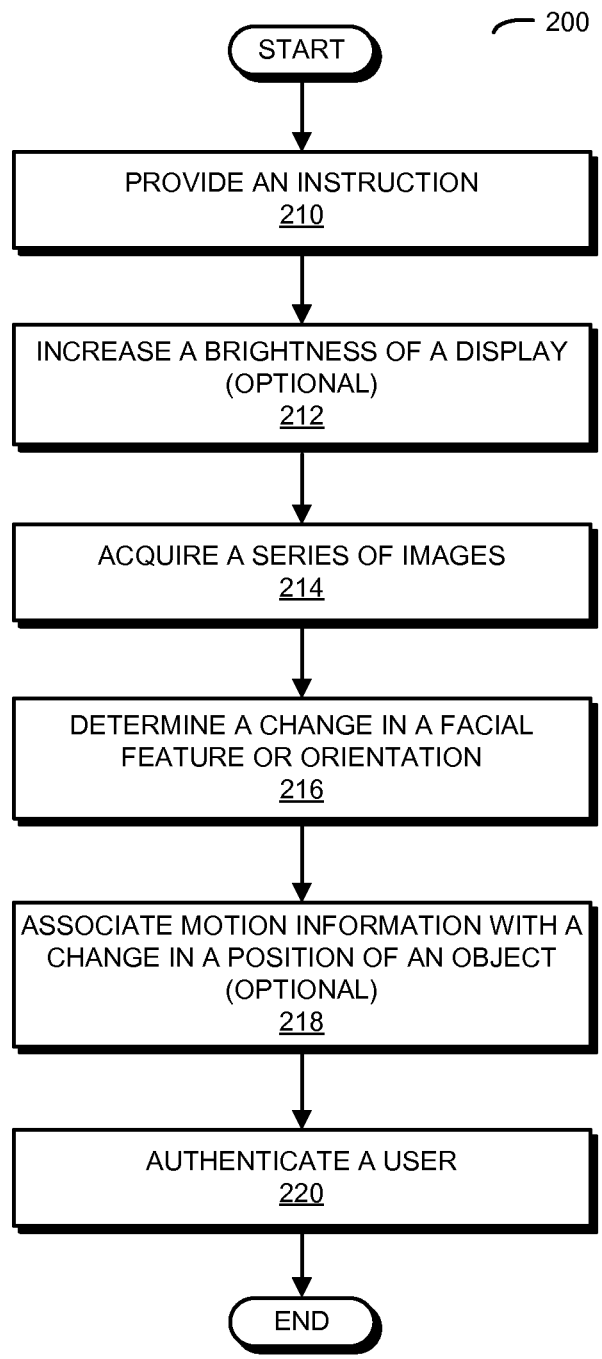
FIG. 2 is a flow diagram illustrating a method for authenticating a user in accordance with an embodiment of the present disclosure.
Figure 6:
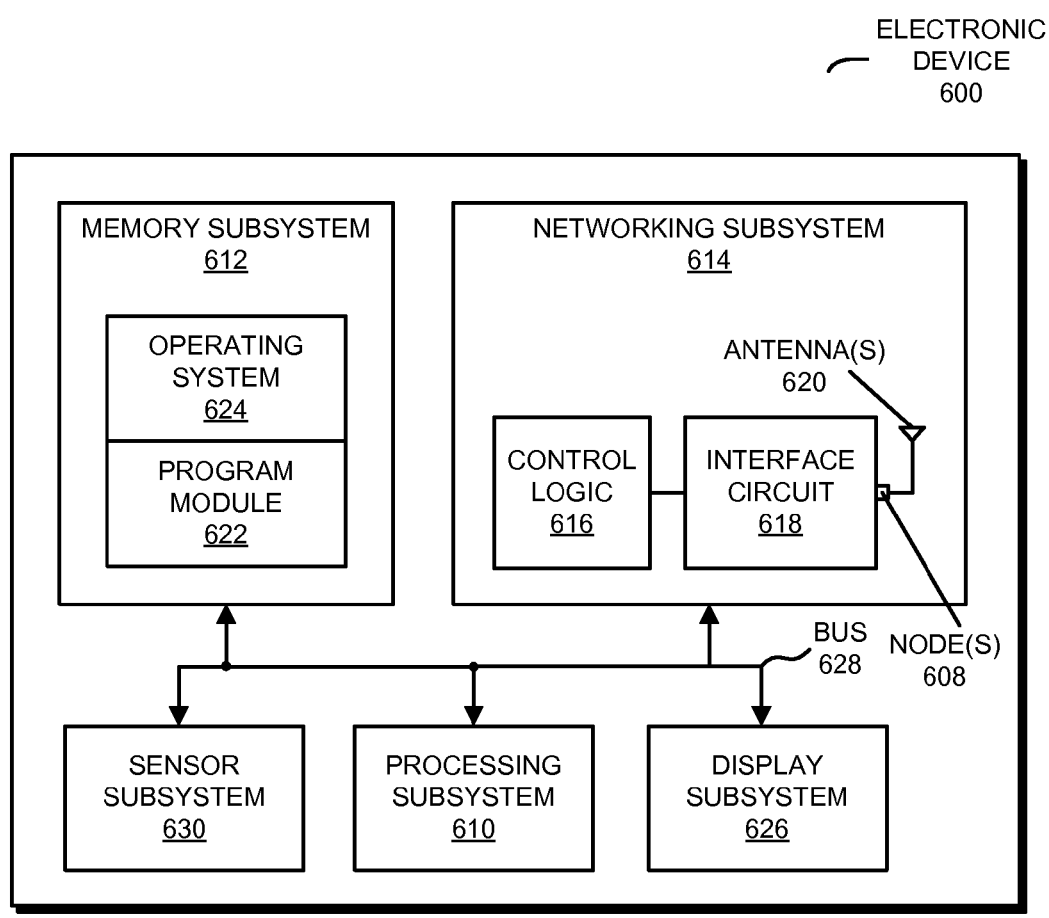
FIG. 6 is a block diagram illustrating an electronic device in accordance with an embodiment of the present disclosure.

FIG. 2 presents embodiments of a flow diagram illustrating method 200 for authenticating a user, which may be performed by a portable electronic device, such as electronic device 500 (FIG. 6). During operation, the portable electronic device provides an instruction to the user to move the portable electronic device (operation 210) relative to a face of the user. For example, the instruction may be displayed on a screen or a verbal command may be issued using a speaker.

Then, using an imaging sensor in the portable electronic device (such as a front-facing camera having at least a 1-2 megapixel resolution), the portable electronic device acquires a series of images (operation 214) while the portable electronic device is at different positions (or orientations) relative to the face of the user, where the series of images include at least two images (such as two photographs or a video with multiple images) relative to a symmetry axis of the face of the user. For example, the portable electronic device may send an instruction or a signal to the imaging sensor to acquire the series of images. Note that the symmetry axis may include a midline of the face of the user. Consequently, the instruction to move the portable electronic device may specify at least a horizontal component of the movement. However, the instructions to move the portable electronic device may also specify a vertical component of the movement. More generally, the instructions to move the portable electronic device may specify a gesture that the user can perform.

Moreover, the portable electronic device determines a change in a facial feature or orientation (operation 216) in at least the two images, such as a change in a sign of a nose angle. For example, the determining (operation 216) may involve: identifying regions that include a nose in the face of the user in at least the two images; determining edges of the nose in the regions using an edge-detection technique; and calculating the nose angle based on the determined edges.

Next, the portable electronic device authenticates the user (operation 220) based on at least one of the series of images using a facial-recognition technique. For example, the facial-recognition technique may include: Haar Cascades for face and facial region detection, and/or a principal component analysis in a facial-identification module.

In some embodiments, prior to the authentication (operation 220), the portable electronic device optionally associates motion information (from a motion sensor in the portable electronic device) with a change in a position of an object (operation 218) in the series of images. For example, the change in the position may be based on differences in pixels in the series of images. Note that the motion information may include vibrations and rotations of the portable electronic device. Moreover, note that the associating may involve correlating or matching the motion information and the change in the position of the object.

Additionally, when ambient light intensity in an environment of the portable electronic device is below a threshold value, the portable electronic device may optionally increase a brightness of the display (operation 212).

Figure 3:
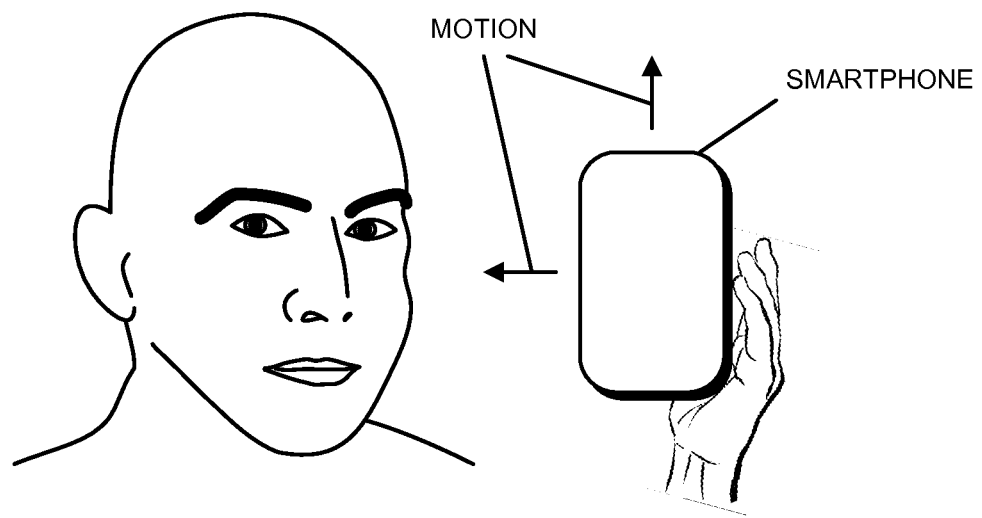
FIG. 3 is a drawing illustrating the method of FIG. 1 in accordance with an embodiment of the present disclosure.

Method 200 may be simple, intuitive and easy to use. In order for authentication to occur, it may only require a user to pick up the smartphone and move it horizontally (or with a horizontal component of the motion) for a short distance in front of their face. In some embodiments, the user first activates an authentication application, e.g., by activating a button in a user interface or a virtual icon on a touch-sensitive display. FIG. 3 presents a drawing illustrating method 200 (FIG. 2).

In this way, the portable electronic device (e.g., software executed by the portable electronic device) may facilitate simple, intuitive and reliable authentication based on a facing-recognition technique. By preventing or reducing the likelihood of successful 2D media attacks and virtual-camera attacks, while maintaining ease of use and fast authentication times, the authentication technique may allow facial recognition to be used on portable electronic devices. This may improve the user experience when using the portable electronic devices.

In some embodiments of method 200 (FIG. 2), there may be additional or fewer operations. Moreover, the order of the operations may be changed, and/or two or more operations may be combined into a single operation.

We now describe nose-angle detection. Assume that a sequence of images (or video frames) is captured by a front-facing camera during a horizontal movement of a smartphone in front of the user's face. The sequence of images may be used to differentiate real 3D faces from 2D counterfeits.

Theoretically, two images may be used for the detection (one from the left side of the face and the other from right), however, more images can improve the accuracy and can prevent an attacker from changing a photograph in the middle of the authentication (a clever attacker may use different photographs to perform an attack).

Given an image or video frame P containing a user's face, it may first be transformed into a grayscale image P'. With the histogram of P' defined as H', histogram equalization may be performed on P' to enhance the contrast. Assume (x, y) is a pixel in P' and its gray level is i, let $$P(i) = \frac{n_i}{n},$$

where $1 \leq i \leq L$, n is the number of pixels of the image, $n_i$ is the number of occurrences of gray level I, and L is the total number of gray levels. Viewing p as a probability density function, the corresponding cumulative distribution function is $$cdf(i) = \sum_{j=0}^{i} p(i).$$

The gray level of the pixel (x, y) in the new image (after histogram equalization) is cdf(i)·(max{i}−min{i})+min(i), where i is the gray level of (x, y) in P'. max{i} (min{i}) is the largest (smallest) gray level in P'. Denote the new image that is obtained as P''', and that all of the following processing may be performed on P'''.

In the next operation, the nose region may be extracted from P'''. Emphasis on the nose may be used because it tends to show significant differences between a real face and a planar photograph in the authentication technique. Given a series of images (which may be captured by the front-facing camera) of a planar face photograph, even if the images are taken from different angles, the noses in these images may be of the same shape and can match each other after necessary rotation, translation and scale. In contrast, given a real 3D face, the noses in multiple images from different angles cannot simply match each other this way. The images taken from left and right may show different sides of the nose. FIG. 4 illustrates the change of the nose (of a real 3D face) captured by a front-facing camera when a smartphone moves horizontally from left to right. The solid lines depict the outlines of the nose. In FIG. 4, note that the face on the left and the one on the right are not mirrors, but they present either side of the face respectively.

Two approaches may be used to detect the nose. In the first approach, face-detection tools are used to determine the face region, and then infer the approximate position of the nose based on biological knowledge. The second approach detects the nose directly by utilizing Haar-like features. Haar-like features may be useful for real-time detection of face and facial regions, such as eyes or nose.

After obtaining the region of the nose in P''', the nose edges may be calculated. One or more edge-detection operators may be used, such as: a prewitt detector, a marr detector, a canny detector, etc. The detected edges in the nose region may be curve fit on the nose edge may be performed using two straight lines. MMSE (minimum mean square error) may be employed for the estimation. Assume a line is expressed as a·x+b, then $$MSE = \sum_i (a \cdot x_i + b - y_i),$$

where $(x_i, y_i)$ are the points in the nose edge. For a single straight line, the values of a and b that minimize the MSE can be calculated. However, for the fitting problem with two uncorrelated lines, the computational complexity may be increased. A heuristic may be used to reduce this complexity. First, the lower half of the nose area may be masked and the edge may be fit within the upper half with a single line $l_1$. Then, the lower half may be unmasked, all the points that are close to $l_1$ (within a threshold) or its extension may be erased, and the rest of the points may be fit by the other line $l_2$.

Apparently, $l_1$ and $l_2$ (or their extensions) may form an angle. If it is a real face, the orientation of this angle may reverse when the camera passes the midline of the face. However, if it is a planar photograph, this orientation change may not happen. In this way, a real face may be differentiated from a 2D counterfeit.

We now describe the cooperation of the motion sensor and the camera or imaging sensor. In addition to determining the difference between a genuine user's face and a 2D counterfeit (photographs or videos), the authentication technique may also be easy to use and much faster than the existing 3D facial authentication techniques. In order to achieve this, one or more motion sensors in a smartphone may be used and images of the user's face may be captured cleverly.

In particular, as soon as the authentication starts (at time $T_0$), the front-facing camera may begin to capture video and may perform face detection (e.g., using Haar Cascade). Once the face area is greater than or equal to a threshold (such as 40% of the area of the video frame), the front-facing camera may start recording video (at time $T_1$). The area of the face may be approximated by the area of the face-detection output (which may be rectangular). At the same time ($T_s$), the authentication technique may start sampling the readings of accelerometers. If no face is detected, the authentication technique may show a prompt and ask the user to move the smartphone closer to their face.

During the video recording, once the face area is smaller than a threshold (such as 30% of the frame area) or when the face can no longer be detected, the video recording may stop. If no horizontal movement is detected, a prompt may be displayed on the screen asking the user to move the smartphone horizontally in front of their face. If the horizontal movement stops for a time period longer than a threshold, the video recording may also stops. Note that the accelerometer sampling may always terminate at the same time when the video recording stops (at time $T_e$).

During the horizontal movement, if the light sensor detects that the ambient illumination is very low, the authentication technique may change the majority of screen area to brighter colors and/or may turn the screen brightness up, which may increase the illumination, make the nose outline clearer and, thus, may improve the accuracy of edge detection.

The authentication technique may analyze the accelerometer readings (from $T_s$ to $T_e$), based on which it may calculate the time when the smartphone is at its left-most and right-most position during the horizontal movement, which may be denoted as $t_l$ and $t_r$, respectively. Then, the video frames captured around $t_l$ and $t_r$ may be used for 2D media-attack detection. In particular, the nose-angle detection technique described previously may be used.

Note that the accelerometer in a smartphone typically has three orthogonal axes. In order to perform a successful facial authentication, the virtual line linking two eyes may be approximately parallel with the width dimension of the front facing camera. Therefore, the horizontal movement required by the authentication technique may be mostly related to the acceleration along the x axis.

An accelerometer may measure the acceleration applied to the smartphone. When a smartphone is stationary, its accelerometer may read a magnitude of about 9.81 m/s², pointing in the direction of gravity. Moreover, when the smartphone is in free fall, the accelerometer may read zero. If the smartphone is used when standing or sitting, it is most likely that the gravity only affects the y axis. However, if a user uses his smartphone in bed or when lying on sofa, gravity can influence x axis readings. Therefore, gravity needs to be filtered out to get the real acceleration of the smartphone. Let $\vec{G}_{ti}$ represent the estimate of gravity. Denoting the accelerometer readings as $\vec{R}$ (this vector has three components: x, y, and z), then $$\vec{G}_{ti} = \alpha \cdot \vec{R}_{ti} + (1-\alpha) \cdot \vec{G}_{ti-1}, \quad (1)$$

and denoting the real acceleration as $\vec{A}$, then $$\vec{A}_{ti} = \vec{R}_{ti} - \vec{G}_{ti}. \quad (2)$$

In Eqns. 1 and 2, $t_i$ are the time points that the sensor readings are collected. The basic idea is to use an exponentially-weighted moving average as a low-pass filter, which isolates the force of gravity. Then the remaining high-frequency part is the real acceleration of the smartphone. Note that α is a smoothing factor, which may be defined as $$\alpha = \frac{\Delta t}{T + \Delta t}, \quad (3)$$

where $\Delta t$ is the sensor-sampling interval (i.e., $t_i - t_{i-1}$), and T is a time constant. For example, T may be 5·Δt.

Having obtained the real acceleration of the smartphone, its displacement during the horizontal movement can be calculated. It can be safely assumed that the velocity of the smartphone at $T_s$ is 0 or close to 0, because the horizontal movement has not started yet. Consequently $$s(t) = \iint_{T_s}^{t} A_x(t) d^2 t, \quad (4)$$

where $A_x(t)$ is the x-component of $\vec{A}$, i.e., the real acceleration of the smartphone along the x axis. s(t) is the relative displacement from the original position (the position at $T_s$. Because of the discrete nature of sensor readings, Eqn. 4 can be expressed as $$s(i) = (\Delta t)^2 \sum_i \sum_i A_{x,ti}. \quad (5)$$

Consequently, the smaller Δt is, the more accurate s(i) becomes. In an exemplary embodiment, Δt is 0.01 s. Then, Ean. 5 may be used to calculate the minimum and the maximum values of s(i) such that $T_s \leq t_i \leq T_e$. These values indicate the left-most and right-most position during the horizontal movement, respectively. Thus, the values of $t_i$ may denote $t_l$ and $t_r$, where s(i) reaches its minimum and maximum.

The recorded video may be examined around time $t_l$, and three frames may be picked at $t_l$–0.1 s, $t_l$, and $t_l$+0.1 s (if the video is 30 fps, these frames are approximately three frames away from each other). These three frames may be processed using the nose-angle detection technique described previously, and the frame with the minimum MSE may be retained. The same operation may be performed on the frames around time $t_r$. Next, the two retained frames may be compared to each other based on the orientation of the angle between $l_1$ and $l_2$.

In the discussion thus far, how to quickly differentiate a real 3D face from a 2D photo (or video) with the help of one or more motion sensors has been discussed. In addition to the frame processing described previously, anomaly detection may be performed on each frame between $t_l$ and $t_r$. Moreover, face detection may be applied to these frames to detect the absence of user's face or duplicated faces, in order to prevent the attacker from changing photographs in the middle of the authentication technique. Although this operation may have to be performed on all the frames between $t_l$ and $t_r$, the cost may be much lower than the 2D counterfeit detection.

Furthermore, the frame around time $(t_l + t_r)/2$ may be used as the input for face recognition (in which the user's face is matched with a template whose identity is being claimed). A wide variety of facial-recognition techniques may be used, such as Haar Cascades.

We now describe detecting virtual-camera attacks, which is another important threat to the facial authentication. Because smartphones are hand-held devices, non-intentional shakes may be inevitable for facial authentication videos captured by the camera or imaging sensor. The basic idea of the approach in the authentication technique is to extract these shakes from the video, and compare with the shakes detected by the motion sensors. If it is a match, it can be inferred that the video was captured in real time. Otherwise, it may likely be a pre-recorded video streamed via virtual-camera software.

Moreover, only small-scale random shakes (non-intentional hand shaking) may be used for the matching, because large-scale motion trajectory can be easily emulated. The virtual-camera detection may be performed by reusing the video and sensor readings recorded during $T_s$ and $T_e$ with extra operation(s) performed by the user.

We now describe video-motion extraction. Given two consecutive frames, $P_i$ and $P_{i-1}$, the scale of the frames is reduced (resized to m×n). Assuming the frame aspect ratio is 3:4, then m is 24 and n is 32. The resized frames are denoted as $\overline{P}_i$ and $\overline{P}_{i-1}$, respectively. Then, panning (vertical and horizontal), rotation and zooming are applied on $\overline{P}_i$, and the frame after processing is noted as $\tilde{P}_i$. The goal is to find the $\tilde{P}_i$ that best matches $\overline{P}_{i-1}$. In the authentication technique, a range for the panning, rotation and zoom operations is set. For example, the panning may not be more than 5 pixels (in each direction) and the rotation may be less than 10°. The limitation may be introduced because only small-scale shakes may be of interest. In particular, the time interval between two consecutive frames may only be around 0.03 s. If the difference between these frames is large, it may be very likely that what was detected is large-scale motion instead of a small shake. Furthermore, because all the combinations of panning, rotation and zoom may need to be tried to find the best match, the search space may be very large. Putting these physical restrictions on the search space may accelerate the authentication technique without negative impact on the results.

The degree of match between $\tilde{P}_i$ and $\overline{P}_{i-1}$ may be measured by a correlation coefficient (and, more generally, an association metric). In comparison with absolute-value matching, the correlation coefficient may better tolerate ambient light change and camera ISO/aperture automatic adjustments.

The correlation coefficient of $\tilde{P}_i$ and $\overline{P}_{i-1}$ may be defined as $$\frac{\sum_{x=0}^{m} \sum_{y=0}^{n} (p_{x,y} - \overline{p}) \cdot (q_{x,y} - \overline{q})}{\sqrt{\sum_{x=0}^{m} \sum_{y=0}^{n} (p_{x,y} - \overline{p}^2)} \cdot \sqrt{\sum_{x=0}^{m} \sum_{y=0}^{n} (q_{x,y} - \overline{q}^2)}},$$

where $p_{x,y}$ is the value of pixel (x, y) in $\overline{P}_{i-1}$, and $q_{x,y}$ is the value of pixel (x, y) in $\tilde{P}_i$. $\overline{p}$ is the mean value for all $p_{x,y}$, while $\overline{q}$ is the average of $q_{x,y}$. For each $\tilde{P}_i$, r is calculated, and the one with highest r may be stored (as denoted by $\hat{P}_i$). Moreover, note that the operation performed between $\tilde{P}_i$ and $\hat{P}_i$ may be denoted by $OP_i$.

If the largest r is smaller than a threshold (such as 0.7), it may be very likely that the motion between $P_i$ and $P_{i-1}$ is so large that any minor shift will not let them match. In this case, the result may be discarded and the next frame pair may be processed ($P_{i+1}$ and $P_i$). Otherwise, the following operations may be performed.

$P_i$ may be divided into small blocks. For each block, a shift to make it best match $P_{i-1}$ (in their original resolutions) may be calculated by using the same approach as for $\hat{P}_i$. The difference may be that previously panning, rotation and zooming were applied, but now only vertical and horizontal panning may be allowed. In other words, now $OP_i$ may be fine-tuned at the block level.

If the majority of the best shifts or the adjustments for each block are the same (or very close), then this value (or the average) may be used as the shake of $P_i$, which is denoted as $\vec{K}_i$. Otherwise, a priority is assigned to each block. The blocks in the background but with details may have the highest priority, the blocks in the foreground may rank the next, and the background blocks with few details may have the lowest priority. The average adjustment of the blocks with the highest priority may be chosen as $\vec{K}_i$. Moreover, foreground and background may be differentiated by the previous face-detection output (with blocks within the face region considered as foreground, and otherwise as background), and details may be judged by the diagonal subband of the wavelet transform of $P_i$ (diagonal subband values may be close to zero if few details exist). If the panning component of $OP_i$ is smaller than a threshold, this component may be added to $\vec{K}_i$, which may be denoted as $\tilde{K}_i$. Otherwise, $\tilde{K}_i$ may be the same as $\vec{K}_i$. Similarly, $\tilde{K}$ may be calculated for each frame during $T_s$ and $T_e$.

This motion-vector extraction approach may include a number of modifications in order to improve the performance. In particular, authentication videos often have their own unique characteristics. For example, the foreground of an authentication video is always a human or human's face. These videos usually do not contain fast moving objects, etc. By utilizing these characteristics, the approach described above can extract motions quickly without negative impact on the results.

In parallel to the motion extraction from video frames, the shakes from accelerometer readings (and, more generally, motion information) may be extracted using a similar approach to that described previously. The shake of the smartphone $\vec{A}$ may be calculated using Eqn. 2. In order to remove large-scale motions, redefine α by letting $T=2 \cdot \Delta t$ in Eqn. 3. As T decreases, α increases, and the cutoff frequency of the filter becomes higher. Note that T may be between $\Delta t$ and $5 \cdot \Delta t$. Because $\tilde{K}$ is a two dimensional vector that may only include the shifts parallel to the camera or imaging sensor plane, the z-component of $\vec{A}$ may be removed, making it consist of merely the comparable information as in $\tilde{K}$. The trimmed $\vec{A}$ may be denoted as $\tilde{A}$.

$\tilde{K}$ and $\tilde{A}$ may then be aligned according to the time scale. As discussed previously, some elements of $\tilde{K}$ may be dropped in this approach, and the corresponding elements in $\tilde{A}$ may be removed if needed. The correlation coefficient (and, more generally, an association metric) may be used to measure the similarity between $\tilde{K}$ and $\tilde{A}$, i.e., $$\rho = \frac{E\left[(\tilde{A} - E(\tilde{A})) \cdot (\tilde{K} - E(\tilde{K}))\right]}{\delta_{\tilde{A}} \delta_{\tilde{K}}},$$

where E is the expectation and δ is the standard deviation. The closer $|\rho|$ is to one, the better $\tilde{K}$ and $\tilde{A}$ match. Otherwise, if $|\rho|$ is close to zero (such as less than 0.4), a virtual-camera attack may be assumed.

In a variation on method 200 (FIG. 2), instead of moving the smarttelephone horizontally across the user's face, it may be moved up or down (i.e., vertically). When a user holds the smartphone naturally, they usually look down onto the smartphone. The user can take a scan of their face by moving the smartphone up while orientating the smartphone to face the their face while they keep their head still. This movement may be less awkward for the user and, thus, may be more user friendly. The authentication technique can verify that the images of the user's face are not a video or photograph attack by matching the movement of the smartphone with the change in the geometry of the user's face from the point of view of the imaging sensor or camera.

Figure 5:
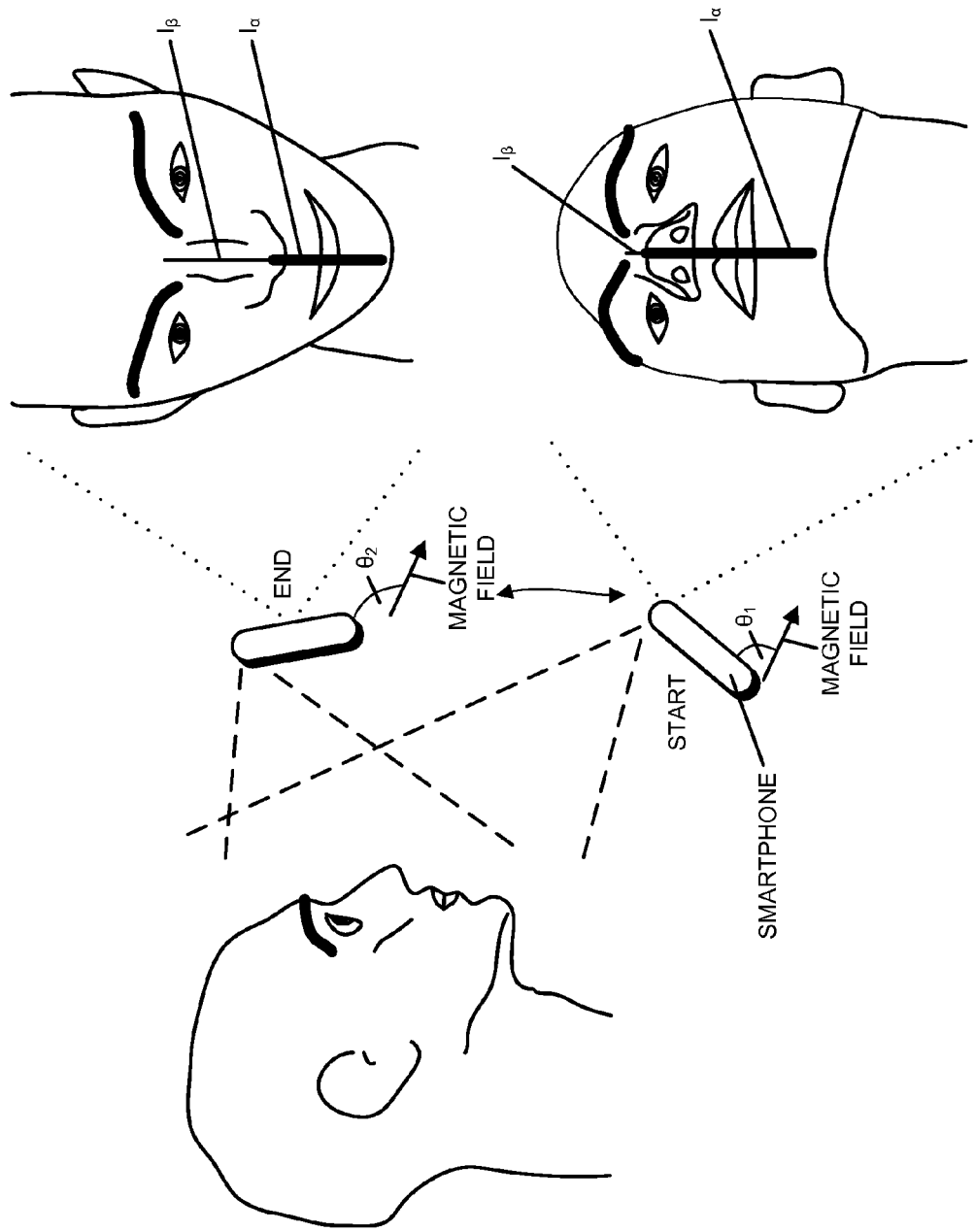
FIG. 5 is a drawing illustrating a change in nose angle in two images in accordance with an embodiment of the present disclosure.

The feature of the user's face that may be used to determine the geometry of their face may be the ratio of the distance from the center of the eye to the nose tip ($l_\beta$) and the distance from the nose tip to the chin ($l_\alpha$). As shown in FIG. 5, which presents a drawing illustrating a change in nose angle in two images, $l_\alpha$ can be determined by drawing a line from the tip of the user's nose to their chin, while $l_\beta$ can be found by drawing a line from the center of the user's eyes to the tip of their nose. Note that a height ratio R may be defined as $$\frac{|l_\beta|}{|l_\alpha|}.$$

The orientation of the smartphone can be used to determine the position of the smartphone with respect to the user's face if they keep their head still. For example, the orientation of the smartphone may be tracked using a magnetometer, a compass or a magnetic field sensor in the smartphone. The magnetometer may read the geomagnetic field for three physical axes (such as x, y, and z). By keeping track of the smartphone orientation with respect to the x-axis, the angle θ of the smartphone with respect to the magnetic field can be found using $$\theta = \frac{180}{\pi} \cdot \tan^{-1}\left(\frac{z}{y}\right).$$

At the start of a scan, the angle may be zeroed using an initial angle $\theta_i$ of the initial position i. Moreover, the angle $\Delta\theta_t$ at time t may be determined using $$\Delta\theta_t = \theta_t - \theta_i.$$

$\Delta\theta_t$ may be stored along with R for time t as the user moves the smartphone to its final position f. Then, the Pearson's correlation coefficient (or another statistical association metric) may be used to determine how well $\Delta\theta_t$ and R are associated. If the correlation coefficient is higher than a predefined threshold, the authentication technique may determine that the face that is detected by the camera is not from a photograph or a video attack.

We now describe embodiments of an electronic device. FIG. 6 presents a block diagram illustrating an electronic device 600. This electronic device includes processing subsystem 610, memory subsystem 612, networking subsystem 614 and sensor subsystem 630. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620. (While FIG. 6 includes one or more antennas 620, in some embodiments electronic device 600 includes one or more nodes 608, e.g., a pad, which can be coupled to one or more antennas 620. Thus, electronic device 600 may or may not include one or more antennas 620.) For example, networking subsystem 614 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Sensor subsystem 630 may include multiple sensors, such as: a motion sensor (e.g., an accelerometer, a gyroscope, an inertial motion sensor, a compass and/or a magnetometer), an ambient light sensor, and/or an imaging sensor (such as a camera).

Within electronic device 600, processing subsystem 610, memory subsystem 612, networking subsystem 614 and sensor subsystem 630 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smart watch, a consumer-electronic device, a portable computing device, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the authentication technique may be implemented using program module 622, operating system 624 and/or in firmware in interface circuit 618. Alternatively or additionally, at least some of the operations in the authentication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments. Moreover, note that the numerical values provided are intended as illustrations of the authentication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A portable electronic device, comprising:
   an imaging sensor that, selectively during operation of the portable electronic device, acquires one or more images;
   a processor electrically coupled to the imaging sensor; and
   memory, electrically coupled to the processor, which stores a program module that, selectively during operation of the portable electronic device, is executed by the processor, the program module including instructions for:
   providing an instruction to a user to move the portable electronic device relative to a face of the user;
   acquiring, using the imaging sensor, a series of images while the portable electronic device is at different positions relative to the face of the user, wherein the series of images include at least two images relative to a symmetry axis of the face of the user;
   determining a change in a sign of a nose angle in at least the two images; and
   authenticating the user based on at least one of the series of images using a facial-recognition technique.

2. The portable electronic device of claim 1, wherein the portable electronic device includes a motion sensor, electrically coupled to the processor, which, selectively during operation of the portable electronic device, measures motion information; and
   wherein, the program module includes instructions for associating, prior to the authenticating, the motion information with a change in a position of an object in the series of images.

3. The portable electronic device of claim 2, wherein the motion sensor includes one of: an accelerometer, a gyroscope, a compass, an inertial motion sensor, and a magnetometer.

4. The portable electronic device of claim 2, wherein the change in the position is based on differences in pixels in the series of images.

5. The portable electronic device of claim 2, wherein the motion information includes vibrations and rotations of the portable electronic device.

6. The portable electronic device of claim 2, wherein the associating involves correlating the motion information and the change in the position of the object.

7. The portable electronic device of claim 1, wherein the series of images includes a video with multiple images.

8. The portable electronic device of claim 1, wherein the program module includes instructions for authenticating the user while preventing successful 2D media attacks and virtual-camera attacks.

9. The portable electronic device of claim 1, wherein the symmetry axis includes a midline of the face of the user.

10. The portable electronic device of claim 1, wherein the instruction to move the portable electronic device specifies at least a horizontal component of the movement.

11. The portable electronic device of claim 1, wherein the portable electronic device includes a display; and
    wherein the portable electronic device includes an ambient light sensor that, during execution of the program module and when ambient light intensity in an environment of the portable electronic device is below a threshold value, increases a brightness of the display.

12. The portable electronic device of claim 1, wherein the determining the change in the sign of the nose angle involves:
    identifying regions that include a nose in the face of the user in at least the two images;
    determining edges of the nose in the regions using an edge-detection technique; and
    calculating the nose angle based on the determined edges.

13. A non-transitory storage medium storing instructions executable by a processor of a portable electronic device, the instructions comprising:
    instructions for providing an instruction to the user to move the portable electronic device relative to a face of the user;
    instructions for acquiring, using an imaging sensor in the portable electronic device, a series of images while the portable electronic device is at different positions relative to the face of the user, wherein the series of images include at least two images relative to a symmetry axis of the face of the user;
    instructions for determining a change in a sign of a nose angle in at least the two images; and
    instructions for authenticating the user based on at least one of the series of images using a facial-recognition technique.

14. The non-transitory storage medium of claim 13, wherein the non-transitory storage medium includes instructions for associating, prior to authenticating, motion information from a motion sensor in the portable electronic device with a change in a position of an object in the series of images.

15. The non-transitory storage medium of claim 14, wherein the associating involves correlating the motion information and the change in the position of the object.

16. The non-transitory storage medium of claim 13, wherein the series of images includes a video with multiple images.

17. The non-transitory storage medium of claim 13, wherein the instruction to move the portable electronic device specifies at least a horizontal component of the movement.

18. The non-transitory storage medium of claim 13, further comprising instructions for increasing a brightness of a display in the portable electronic device when an ambient light sensor in the portable electronic device indicates that ambient light-intensity in an environment of the portable electronic device is below a threshold value.

19. The non-transitory storage medium of claim 13, wherein the instructions for the determining the change in the sign of the nose angle comprise:
- instructions for identifying regions that include a nose in the face of the user in at least the two images;
- instructions for determining edges of the nose in the regions using an edge-detection technique; and
- instructions for calculating the nose angle based on the determined edges.

20. A method for authenticating a user, wherein the method comprises:
- providing an instruction to the user to move a portable electronic device relative to a face of the user;
- using an imaging sensor in the portable electronic device, acquiring a series of images while the portable electronic device is at different positions relative to the face of the user, wherein the series of images include at least two images relative to a symmetry axis of the face of the user;
- determining a change in a sign of a nose angle in at least the two images; and
- authenticating the user based on at least one of the series of images using a facial-recognition technique.

* * * * *